United States Patent
Feero et al.

(10) Patent No.: US 10,007,616 B1
(45) Date of Patent: Jun. 26, 2018

(54) METHODS FOR CORE RECOVERY AFTER A COLD START

(71) Applicant: Apple Inc., Cupertino, CA (US)

(72) Inventors: Brett S. Feero, Austin, TX (US); David J. Williamson, Austin, TX (US); Jonathan J. Tyler, Austin, TX (US); Mary D. Brown, Austin, TX (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 15/062,448

(22) Filed: Mar. 7, 2016

(51) Int. Cl.
*G06F 12/08* (2016.01)
*G06F 12/0891* (2016.01)
*G06F 12/0862* (2016.01)
*G06F 12/0875* (2016.01)
*G06F 12/0831* (2016.01)
*G06F 12/128* (2016.01)

(52) U.S. Cl.
CPC ...... *G06F 12/0891* (2013.01); *G06F 12/0833* (2013.01); *G06F 12/0862* (2013.01); *G06F 12/0875* (2013.01); *G06F 12/128* (2013.01); *G06F 2212/452* (2013.01); *G06F 2212/6026* (2013.01); *G06F 2212/621* (2013.01); *G06F 2212/69* (2013.01)

(58) Field of Classification Search
CPC ............. G06F 12/0891; G06F 12/0833; G06F 12/0862; G06F 12/0875; G06F 12/128; G06F 2212/452; G06F 2212/6026; G06F 2212/621; G06F 2212/69
See application file for complete search history.

(56) References Cited

U.S. PATENT DOCUMENTS

| 5,038,278 | A | 8/1991 | Steely, Jr. et al. |
| 6,842,836 | B2 | 1/2005 | Yun et al. |
| 7,313,655 | B2 | 12/2007 | Hsu |
| 2007/0239940 | A1 | 10/2007 | Doshi et al. |
| 2014/0108740 | A1* | 4/2014 | Rafacz ............... G06F 12/0862 711/137 |
| 2016/0321183 | A1* | 11/2016 | Govindan ........... G06F 12/0862 |

\* cited by examiner

*Primary Examiner* — Reginald G Bragdon
*Assistant Examiner* — Edward Wang
(74) *Attorney, Agent, or Firm* — Meyertons, Hood, Kivlin, Kowert & Goetzel, P.C.

(57) ABSTRACT

In an embodiment, an apparatus includes a cache memory and a control circuit. The control circuit may be configured to pre-fetch and store a first quantity of instruction data in response to a determination that a first pre-fetch operation request is received after a reset and prior to a first end condition. The first end condition may depend on an amount of unused storage in the cache memory. The control circuit may be further configured to pre-fetch and store a second quantity of instruction data in response to a determination that a second pre-fetch operation request is received after the first end condition. The second quantity may be less than the first quantity.

20 Claims, 6 Drawing Sheets

METHODS FOR CORE RECOVERY AFTER A COLD START

BACKGROUND

Technical Field

Embodiments described herein are related to the field of integrated circuit implementation, and more particularly to the operation of processing cores.

Description of the Related Art

During a reset of a processor, data held in various memories used by the processor, such as, for example, cache memories and branch prediction tables, may be lost. For example, if the processor enters a reduced power mode, power signals to various memories may be disabled as part of the power saving mode. Upon an exit from such a mode (which may be referred to as a "cold restart" or "cold reset"), data may be stored in these memories before the processor can make use of them. For instance, a cache memory may not provide a benefit to the processor until one or more cache lines have been populated with data or pre-fetched instructions. Likewise, a branch prediction table may not be useful until entries for at least one branch instruction have been filled. Performance of the processor may be hindered after a cold restart as a result of cache memories and branch history tables losing their contents.

SUMMARY OF THE EMBODIMENTS

Various embodiments of a processor are disclosed. Broadly speaking, a system, an apparatus, and a method are contemplated in which the apparatus includes a cache memory and a control circuit. The control circuit may be configured to pre-fetch and store a first quantity of instruction data in response to a determination that a first pre-fetch operation request is received after a reset and prior to a first end condition. The first end condition may depend on an amount of unused storage in the cache memory. The control circuit may be further configured to pre-fetch and store a second quantity of instruction data in response to a determination that a second pre-fetch operation request is received after the first end condition. The second quantity may be less than the first quantity.

In an embodiment, the apparatus may include a memory configured to store a plurality of entries. Each entry may be configured to store a history of branch predictions. The control circuit may be further configured to allocate a first number of entries of the plurality of entries in response to a determination that a first branch instruction is executed after the reset and prior to a second end condition. The second end condition may depend upon a number of unused entries allocated in the memory. The control circuit may be further configured to allocate a second number of entries of the plurality of entries in response to a determination that a second branch instruction is executed after the second end condition. The second number of entries may be less than the first number of entries.

In a further embodiment, the second end condition may be dependent upon a number of entries unsuccessfully allocated after the reset. In a further embodiment, to allocate the first number of entries, the control circuit may be further configured to decrement a count value in response to a determination that a given entry of the first number of entries is successfully allocated. The control circuit may also be configured to increment the count value in response to a determination that the given entry of the first number of entries is not successfully allocated.

In another embodiment, wherein the first end condition may be dependent upon a number of cache evictions that occur after the reset. In another embodiment, to pre-fetch and store the first quantity of instruction data, the control circuit may be further configured to decrement a count value in response to a determination that a given cache line of the first number of the plurality of cache lines includes valid data. The control circuit may also be configured to increment the count value in response to a determination that storing the first instruction data resulted in an eviction of the given cache line. In one embodiment, the reset may correspond to a power-on reset.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

This disclosure describes an apparatus and a method for repopulating processing core memory resources, such as, for example, cache memories and branch prediction tables, after a cold reset. As used herein, a "cold reset" (also referred to herein as a "cold restart" or a "start event") refers to resuming operation from any reset or exception event that results in a processor or system-on-chip (SoC) to lose data from memories and/or registers utilized by at least one processing core in the processor or SoC. For example, start events may include resuming operation from a power-on reset (POR), or a recovery from a reduced power mode. In some cases, data may not be lost, but confidence in the validity of the data may be lost. For example, confidence is the validity of data may be lost as a result of a power brown-out (when a voltage level of a power supply drops temporarily below a minimum operating level, but does not reach zero volts), or an exception generated by a system protection mechanism such as, e.g., a watchdog, an illegal address, an illegal opcode exception, or any exception that may indicate that the processor/SoC is not operating as expected.

Processing core resources, such as instruction caches and branch prediction tables may improve performance and/or efficiency of a processing core by storing data such as frequently used instructions or indications of whether or not a given branch instruction will branch or not. These resources, however, may not provide significant benefit until they have stored an appropriate amount of data. When these resources are reset and must be refilled with valid data, the processing core may execute hundreds, thousands, or more, of instructions before the resources include enough data to provide a significant benefit to the processing core.

Embodiments of systems and methods for decreasing a time for processing core resources to be refilled are disclosed herein. The disclosed embodiments demonstrate methods for increasing refill rates for resources in response to a start event.

Figure 1:
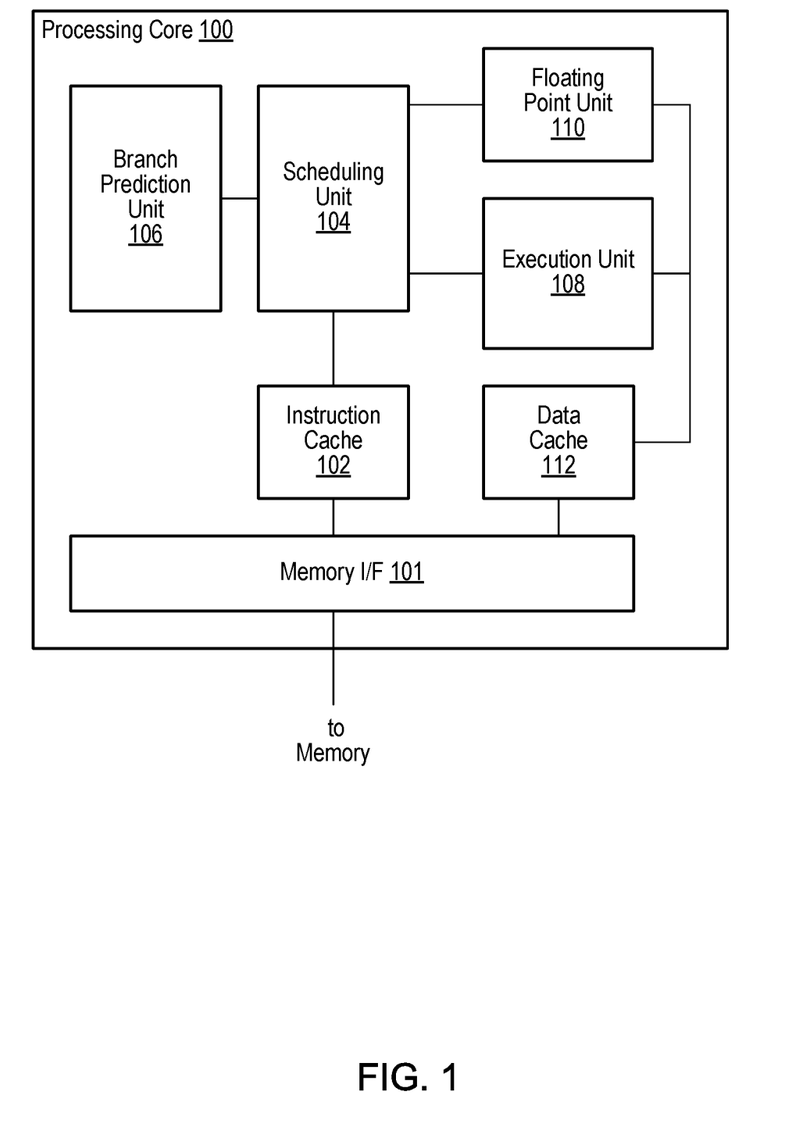
FIG. 1 illustrates a block diagram of an embodiment of a processing core.

A block diagram of an embodiment of processing core is illustrated in FIG. 1. Processing core 100 may be a part of a larger processor or SoC, and may be one of multiple processing cores in the processor or SoC. In the present embodiment, processing core 100 includes memory interface (memory I/F) 101 coupled to Instruction Cache 102 and Data Cache 112. Instruction Cache 102 is coupled to Scheduling Unit 104 which is, in turn, coupled to Branch Prediction Unit 106, Execution Unit 108, and Floating Point Unit 110.

In the illustrated embodiment, Memory Interface 101 is used to fetch instructions and data from memories located outside of processing core 100. Memory Interface 101 may be coupled to a higher level cache, such as, for example, an L2 or L3 cache, to a system memory (e.g., static random access memory (SRAM) or dynamic random access memory (DRAM), and to a non-volatile storage such as flash memory or a hard disk drive (HDD). In various embodiments, Memory Interface 101 may be coupled directly to some or all of these memories via a bus, or coupled to one or more memory controller units that receive memory requests from Memory Interface 101 and reply to the requests with appropriate data from a corresponding memory location. Memory Interface 101 may include individual circuits for fetching instructions and fetching data, or may share circuitry for data and instruction fetches.

Instructions fetched via Memory Interface 101 may be stored in Instruction Cache 102. Instruction Cache 102 may be implemented as any suitable type of cache memory, such as, for example, direct mapped cache, two-way set associative, four-way set associative, and the like. In the present embodiment, Instruction Cache 102 includes multiple entries, referred to herein as cache lines. Each cache line may store one or more instructions from a software or firmware program to be executed by processing core 100. A given instructions may be prefetched, i.e., copied from memory into a corresponding cache line before the processing core is ready to execute the instruction. Such prefetching may reduce a number of wait states processing core 100 experiences by having a series of instructions preloaded into Instruction Cache 102 where they may be accessed faster than other memory locations in a computing system including processing core 100.

In the illustrated embodiment, Scheduling Unit 104 fetches and decodes instructions and places them in an instruction queue for execution by Execution Unit 108 or Floating Point Unit 110. Scheduling Unit 104 may also control prefetching of instructions for Instruction Cache 102, including determining a rate at which Instruction Cache 102 prefetches instructions. For example, Scheduling Unit 104 may set a prefetch rate of one cache line, in which one cache line is prefetched as instructions are accessed from a previously fetched cache line. In some embodiments, Scheduling Unit 104 may set a variable prefetch rate, in which the prefetch rate is determined by a state of processing core 100. For example, Scheduling Unit 104 may set a prefetch rate of one or two cache lines during normal operation of processing core 100. If Scheduling Unit 104 determines that a number of valid cache lines in Instruction Cache 102 is below a threshold, then the prefetch rate may be increased to three or four cache lines until Scheduling Unit 104 determines that the number of valid cache lines is greater than the threshold, at which time the prefetch rate is reduced back to one or two. An event, such as a cold reset, may trigger Scheduling Unit 104 to set a higher prefetch rate for Instruction Cache 102 since a cold reset invalidates any instructions previously stored in Instruction Cache 102, in effect causing Instruction Cache 102 to be empty.

Scheduling Unit 104, in the present embodiment, uses Branch Prediction Unit 106 to help predict a flow of an active program. When an instruction other than a branch or jump instruction is executed, a program counter within Scheduling Unit 104 is incremented (or, in some embodiments, decremented). A value in the program counter is used to point to a memory address storing the next program instruction. When a branch or jump instruction is executed, a new value may be written to the program counter, causing program flow to deviate to another portion of code, such as, for example, a subroutine or back to a beginning of a software loop. During execution of a branch instruction, a determination is made based on a data value or condition of processing core 100 to either continue the linear program flow (i.e., don't take a branch), or to fetch a next instruction from an non-contiguous memory location (i.e., take the branch). When prefetching instructions, a branch instruction impacts the next prefetch. For example, if a branch instruction is included in a first prefetch and a second prefetch assumes a linear program flow, then if the branch is taken (i.e., non-linear program flow), the second prefetch may be useless as the fetched instructions aren't next to be executed.

Branch Prediction Unit 106 is used by Scheduling Unit 104 to help predict if a given branch instruction will be taken or not.

In some embodiments, a single data bit may be used as prediction indicator with a first value of the bit predicting the branch won't be taken and a second value predicting the branch will be taken. Other embodiments may use more than one bit as a prediction value. For example, if two bits are used, then four predictions may be assigned to a given branch instruction. For the embodiments, included herein, two bits are assigned to each branch prediction value, with the four states corresponding to strongly predicting a branch is taken, weakly predicting a branch is taken, weakly predicting a branch is not taken, and strongly predicting a branch is taken. Scheduling Unit 104 may use a corresponding entry in Branch Prediction Unit 106 to determine a memory location for a next instruction prefetch.

Branch Prediction Unit 106 may include multiple tables, with each table including multiple entries for tracking a history of branches taken and not taken for multiple branch instructions. Each entry in a first table may correspond to a respective set of memory addresses. As a given branch instruction is fetched, the entry corresponding to the address of the given branch instruction may be allocated to the given branch instruction. Upon execution of the branch instruction, a value associated with the entry may be updated dependent upon the direction taken from the given branch instruction.

In some embodiments of Branch Prediction Unit 106, an entry allocated to a given branch instruction may include a predicted destination address in addition to a predicted direction. Some branch instructions may include a constant address offset for a branch taken destination, while other branch instructions may include a variable value for determining the destination of the branch, such as a value in a core register or memory location. For branch instructions that include a variable value, the destination address may be predicted as well as the direction of the instruction.

In the present embodiment, Execution Unit 108 retrieves instructions from an instruction queue that has been populated by Scheduling Unit 104. Execution Unit 108 processes logic and integer instructions, while floating point instructions are retrieved by Floating Point Unit 110. In some embodiments, Execution Unit 108 and Floating Point Unit 110 may retrieve instructions from the same instruction queue, in which instructions in the queue are tagged for processing by the appropriate unit. In other embodiments, Scheduling Unit 104 may include separate instruction queues for Execution Unit 108 and Floating Point Unit 110. To process instructions, Execution Unit 108 or Floating Point Unit 110 may fetch data from Data Cache 112.

Data Cache 112 may be implemented as any suitable type of cache memory, such as, for example, direct mapped cache, two-way set associative, four-way set associative, and the like. In the present embodiment, Data Cache 112 includes multiple entries, referred to herein as cache lines. Each cache line may store one or more data items to be used by Execution Unit 108 and/or Floating Point Unit 110. Data items may include any data values used during process of instructions.

It is noted that, to improve clarity and to aid in demonstrating the disclosed concepts, the diagram of processing core 100 illustrated in FIG. 1 has been simplified. In other embodiments, different and/or additional circuit blocks and different configurations of the circuit blocks are possible and contemplated.

Figure 2:
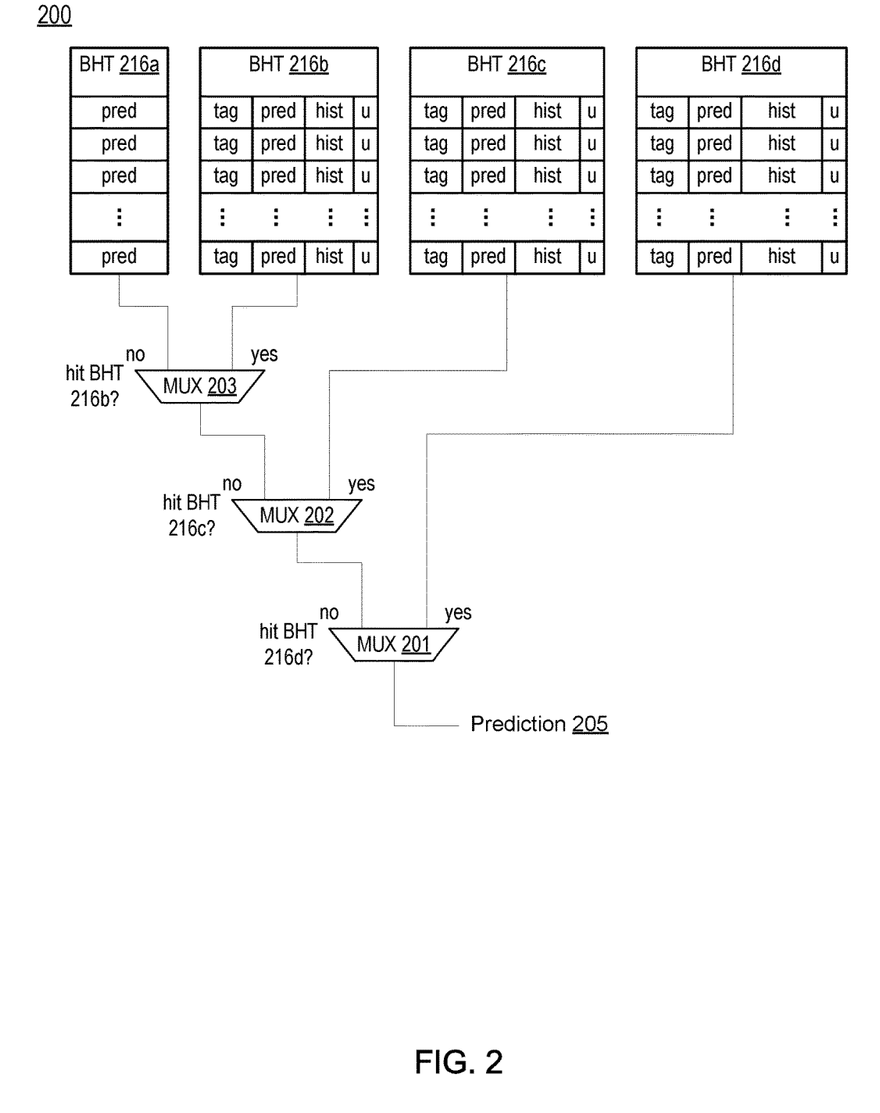
FIG. 2 shows a diagram of branch history tables for use by a branch prediction unit.

Turning to FIG. 2, a diagram illustrating branch history tables for use by a branch prediction unit is shown. Branch Prediction Unit 200 may, in some embodiments, correspond to Branch Prediction Unit 106 in FIG. 1. The illustrated embodiment of Branch Prediction Unit 200 includes multiple branch history tables, BHT 216a through BHT 216d. Several multiplexing circuits, MUX 201 through MUX 203, are coupled to BHT 216a-d, and used to select and output a prediction value from one of BHTs 216a-d as prediction signal 205.

In the illustrated embodiment, Branch Prediction Unit 200 includes four branch history tables 216a-d used for predicting a direction that one or more branch instructions will take upon execution by, for example, Execution Unit 108 in FIG. 1. Each of the four BHTs 216a-d stores multiple entries, with entries storing data for corresponding branch instructions. When a given branch instruction is allocated, a default prediction value may be assigned to the allocated entry. In the present embodiment, default prediction values are stored in BHT 216a. Two data bits are used to indicate the prediction value, resulting in four possible predictions: strong taken, weak taken, weak not taken, and strong not taken. In various embodiments, any one of the four values may be assigned as a default prediction value. Upon execution of the given branch instruction, the prediction value may be updated. For example if the default prediction is weak taken and the branch is taken, then the prediction may be updated to strong taken. If, instead, the branch is not taken, then the prediction may be updated to weak not taken.

BHT 216b includes an address tag, a prediction value, and history data for each entry. When a given branch instruction is fetched, circuitry in Branch Prediction Unit 200 generates an address tag that corresponds to the memory address the given branch instruction was fetched from. If an entry in BHT 216a corresponding to the address tag is available, then the entry is allocated to the given branch instruction. If the entry in BHT 216a corresponding to the address tag has already been allocated to the given branch instruction, then the most recent branch direction is added to the history data and the prediction value may be updated. If the corresponding entry has been allocated to a different branch instruction, then another bit in the tag may be used to determine if the current allocated entry is useful. A respective additional useful bit may be included in the entry (shown as "u" in BHTs 216a-d). The useful bit indicates if the respective entry is useful for predicting the branch direction of the allocated instruction. If the respective useful bit indicates that the currently allocated entry is useful, then the allocation for the given branch instruction may be aborted and the attempted allocation may be referred to as unsuccessful. Otherwise, the entry may be updated to correspond to the given branch instruction.

In the present embodiment, BHT 216c includes similar data as BHT 216b for each entry, such as an address tag, a prediction value, history data, and a useful bit. BHT 216b includes a greater amount of history data than BHT 216b. The history data is used to track one or more recent branch directions taken by the corresponding branch instruction. For example, if three data bits are used for prediction history for a given entry, then the last three branch directions for the corresponding branch instruction may be tracked, with each bit indicating one branch direction. If the three previous branch directions are taken, taken, and not taken, then the respective data bit values may be 1, 1, and 0. This additional history data may be used to improve an accuracy of the prediction value. For example, a pattern may be recognized in which, for a given branch instruction, the not taken branch is not observed to occur two times in a row. In such a case, if the most recent branch direction was not taken, then prediction value may be updated to weak taken or strong taken. In some embodiments, a given entry in BHT 216b or BHT 216c may be updated on each fetch of an allocated branch instruction. In other embodiments, the given entry may be updated less frequently.

BHT 216d, in the illustrated embodiment, is similar in content and operation as BHT 216b and BHT 216c. BHT 216d includes more history data than BHT 216c and BHT 216b. For each entry in BHTs 216b-d, the respective prediction value may be updated dependent upon pattern recognition within the history data. For branch instructions used as part of software loops or other types of repetitive software processes, the increased history data may result in more accurate branch predictions. In other types of branch instructions, however, the predictions may be more random and the extra history data may result in lower accuracy of predictions. This progression from no history data in BHT 216a to the most history data in BHT 216d may result in improved efficiency for a greater number of branch instructions, and, therefore, for greater efficiency for a processing core that includes Branch Prediction Unit 200.

When a given branch instruction is fetched that has one or more allocated entries in BHTs 216a-d, circuitry in Branch Prediction Unit 200 looks for a corresponding entry in BHT 216d first by generating a tag value dependent upon the address of the given branch instruction. If the tag value matches an address tag in BHT 216d (a branch table "hit"), then a prediction value is retrieved from the hit entry and output as prediction value 205. Otherwise, BHT 216c is searched for a matching address tag, and then BHT 216b is searched, and then BHT 216a. MUXs 201-203 are set accordingly to select a prediction value 205 retrieved from a hit BHT 216a-d with the most history data. This type of branch prediction unit may be referred to as a tagged geometric prediction (TAGE) unit.

During normal operation of the present embodiment, updates to entries corresponding to a branch instruction may be limited to one or two of the BHTs 216a-d per execution of the instruction. For example, a first execution of the given branch instruction may result in BHT 216a and BHT 216b being updated. A subsequent execution of the given branch instruction may result in BHT 216a and BHT 216c being updated. Which BHTs 216a-d are updated may depend upon an accuracy of the predictions from the previous execution of the given branch instruction. After a start event, however, corresponding entries in more than two BHTs 216a-d may be updated. Three of the entries or even all four entries may be updated after a start event in order to refill the BHTs 216a-d faster. This accelerated process may continue until a determination is made that the BHTs 216a-d contain an adequate number of allocated entries. More details on the accelerated process will be provided below.

It is noted that in various embodiments, BHTs 216a-d may be stored in a single memory array, in one memory array per BHT, or any combination thereof. In addition, each entry may correspond to one or more memory cells or to one or more bytes of memory cells.

It is also noted that the embodiment of Branch Prediction Unit 200 as illustrated in FIG. 2 is merely an example. The illustration of FIG. 2 has been simplified to highlight features relevant to this disclosure. Various embodiments may include different configurations of components, such as a different number of branch history tables, and/or differences in data stored in each entry of the branch history tables.

Although a TAGE type of branch prediction unit is presented herein, other types of branch prediction units are contemplated.

Figure 3:
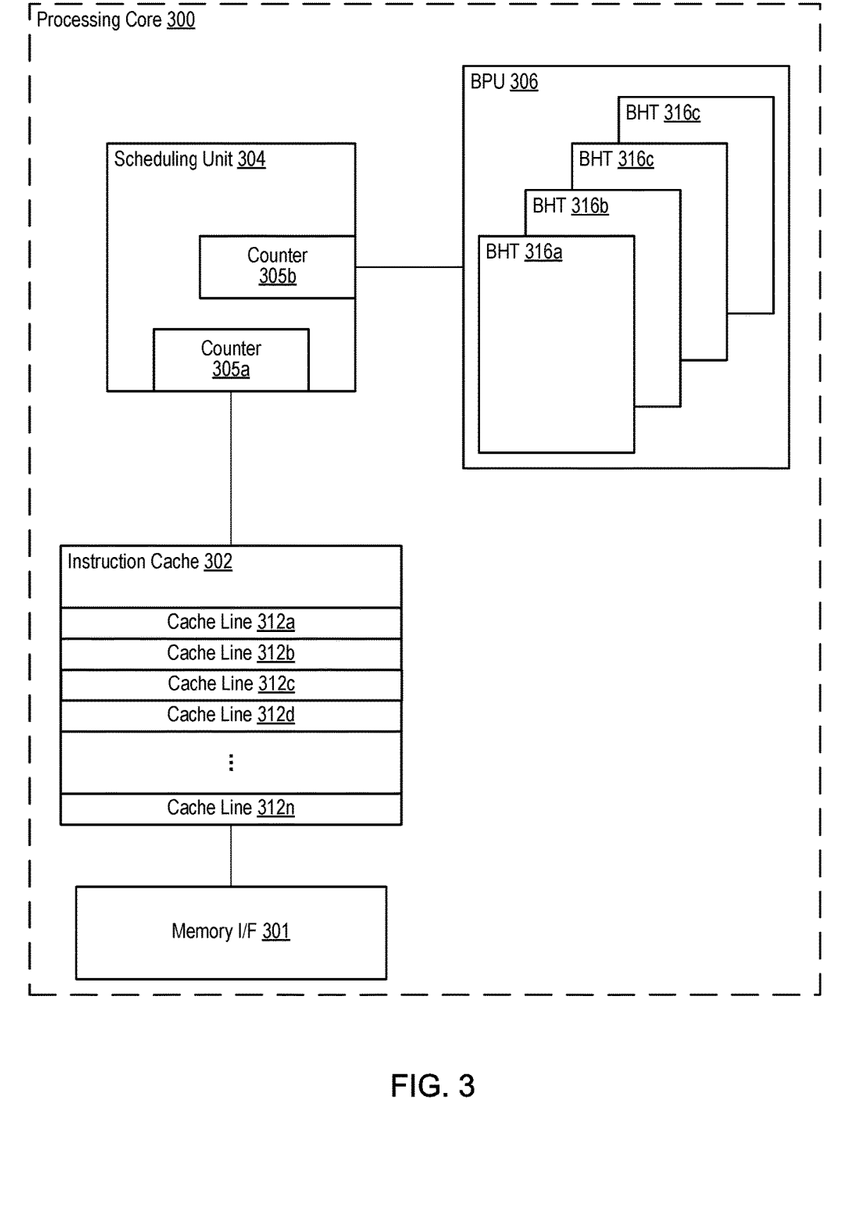
FIG. 3 illustrates a block diagram of another embodiment of a processing core.

Moving to FIG. 3, a block diagram depicting an embodiment of a scheduling unit, an instruction cache and a branch prediction unit is illustrated. Processing core 300 includes Scheduling Unit 304 coupled to branch prediction unit (BPU) 306 and to Instruction Cache 302. Instruction Cache 302 is further coupled to memory interface (Memory I/F) 301. Scheduling Unit 304 includes Counters 305a and 305b. Instruction Cache 302 includes Cache Lines 312a-312n. BPU 306 includes branch history tables (BHTs) 316a-316d.

In the illustrated embodiment, during normal operation, Scheduling Unit 304 causes Instruction Cache 302 to retrieve a first predetermined number of cache lines for each cache fetch operation. In addition, Scheduling Unit 304 causes BPU 306 to allocate entries in a second predetermined number of BHTs 316a-d for each executed branch instruction. These first and second predetermined numbers may be selected in order to maintain a balance between keeping Instruction Cache 302 and BPU 306 filled with adequate numbers of entries while not displacing useful data already stored in Cache Lines 312a-n and BHTs 316a-d.

After a start event, however, Cache Lines 312a-n and BHTs 316a-d may be empty or storing invalid data. Therefore, Instruction Cache 302 and BPU 306 may not provide much benefit to the efficiency or performance of processing core 300 until Cache Lines 312a-n and BHTs 316a-d have been refilled with an adequate amount of data. In the present embodiment, to reduce an amount of time to receive an operational benefit from Instruction Cache 302 and BPU 306 after the start event, Scheduling Unit 304 increases a rate at which Cache Lines 312a-n and BHTs 316a-d are refilled. For example, instead of retrieving the first number of cache lines for each cache fetch operation, Scheduling Unit 304 causes Instruction Cache 302 to retrieve a third number of cache lines per fetch operation, in which the third number is greater than the first number. Similarly, Scheduling Unit 304 causes BPU 306 to allocate entries in an increased number of BHT 316a-d for each executed branch instruction. In an example embodiment, after a start event, Scheduling Unit 304 causes Instruction Cache 302 to switch from retrieving one cache line via the memory per fetch operation to retrieving three cache lines per fetch operation. In the same embodiment, Scheduling Unit 304, after the same start event, causes BPU 306 to allocate entries in four of BHTs 316a-d rather than two.

Continuing with the example embodiment, these increased rates for refilling Cache Lines 312a-n and BHTs 316a-d continue until Scheduling Unit 304 determines that an adequate amount of data have been stored. To accomplish this task, Scheduling Unit 304 includes Counter 305a, coupled to Instruction Cache 302 and Counter 305b, coupled to BPU 306. Counters 305a-b are used to track one or more respective operational parameter for each of Instruction Cache 302 and BPU 306. At least one count value in each Counter 305a-b is incremented or decremented dependent upon the respective tracked operational parameter. Upon a given count value reaching a respective threshold value, the increased rate for refilling Cache Lines 312a-n or BHTs 316a-d may be reduced. In some embodiments, a single, respective threshold for each Counter 305a-b may be used such that when a count value reaches the threshold value, the respective refill rate is reduced from the increased refill rate to the normal operating rate. In other embodiments, multiple threshold values may be used for each Counter 305a-b, allowing for a more gradual reduction in the refill rates from the cold start increased rate to the normal operating rate.

Various operational parameters may be tracked in various embodiments. To monitor the operation of Instruction Cache 302, several parameters may be monitored, such as, for example, a cache line fill count, a cache hit count, or a cache line eviction count. The cache line fill count may track a number of cache lines filled with prefetched data since the start event, with the corresponding count value being incremented in response to each Cache Lines 312a-n being filled. Upon reaching a threshold number of Cache Lines 312a-n filled, the increased fill rate may be reduced.

The cache hit count may indicate a level of performance or efficiency being provided by Instruction Cache 302. A high cache hit count may indicate that I-cache has been filled with enough data to provide an adequate benefit to processing core 300. A respective count value in Counter 305a may be increased for each Instruction Cache 302 hit and decremented for each Instruction Cache 302 miss. In response to the respective count value reaching a threshold value, the increased fill rate may be reduced. On the contrary, a low Instruction Cache 302 hit count combined with a high cache line fill count may indicate that Instruction Cache 302 is being filled with the wrong data. In such an embodiment, a first count value may be increased upon an Instruction Cache 302 miss and decremented for each hit, while also incrementing a second count value for each Cache Lines 312a-n that is filled. Reduction of the increased refill rate can be made dependent upon a combination of the two count values.

The cache eviction count may indicate a level of benefit being provided by Instruction Cache 302. A respective count value in Counter 305a may be incremented in response to an eviction of a Cache Lines 312a-n, while the count value may be decremented for each cache hit. A low eviction count may indicate that either Instruction Cache 302 is not very full or that Instruction Cache 302 is experiencing a high hit rate. In either case, continuing the increased refill rate may be considered beneficial. In contrast, a high eviction count may indicate that Instruction Cache 302 is filling up with data that is not beneficial for the performance of processing core 300. In response to the eviction count reaching a respective threshold, Scheduling Unit 304 may reduce the increased refill rate.

Similar to the parameters tracked for Instruction Cache 302, various operational parameters may be tracked for BPU 306. For example, operational parameters may include a number of successful entries allocated or a number of useful bits set. The number of successful allocation into BHTs 316a-d may indicate how full the collective BHTs 316a-d are. More allocated entries may provide an indication that more branch history is being collected. In this case, a respective count value in Counter 305b may be incremented on each successful allocation and decremented for each unsuccessful allocation, and the increased refill rate may be reduced upon the respective count value reaching a threshold value. Conversely, an increase in a number of unsuccessful allocations may indicate that BHTs 316a-d are being filled with previous allocations. While BHTs 316a-d have few allocated entries, the increased refill rates may provide benefit by allowing branch predictions to be made based on at least some amount of stored data. An increase in the number of unsuccessful allocations, however, may indicate a point at which allocation rates should be reduced to normal operating rates. In such an embodiment, a respective count value may be increased in response to an unsuccessful allocation and decremented in response to a successful allocation. The increased refill rate may be reduced upon the respective count value reaching the threshold value.

In some embodiments, the useful bit, as described above in FIG. 2, may be tracked instead of, or in addition to the number of successful/unsuccessful entry allocations. As previously disclosed, the useful bit indicates if a respective allocated entry in one of BHTs 316a-d is useful for predicting branch directions. A respective count value in Counter 305b may be incremented each time a useful bit is set in any of BHTs 316a-d. The more useful bits that are set, then the more useful prediction data that is being stored in BHTs 316a-d. Since, however, a set useful bit may prevent an allocated entry from being evicted, a high number of useful bits may also prevent new entries corresponding to branch instructions without a current allocated entry from getting one allocated. To leave some number of unallocated entries available for branch instructions yet to be executed, the current refill rate may be reduced upon reaching a threshold number of useful bits being set.

In other embodiments, one or both of Counters 305a-b may correspond to a timer counter. Instead of, or in addition to, tracking cache memory or branch history table parameters, Counters 305a-b may receive a clock signal and use a count value to track an elapsed time period. In various embodiments, the elapsed time period may be used as an indication to reduce the refill rates to normal operating rates. For example, a timer count value may be used to limit a time period for the increased refill rate such that if the count value of a tracked parameter does not reach a threshold value within a predetermined time period, then the refill rate is still reduced to the normal operating rate.

It is noted that processing core 300 illustrated in FIG. 3 is an example for demonstrating the disclosed concepts. The number of functional blocks shown as well as the number of branch history tables and cache lines illustrated are limited for clarity. In other embodiments, additional functions blocks may be included. Any suitable number of cache lines and branch history tables may also be included.

Figure 4:
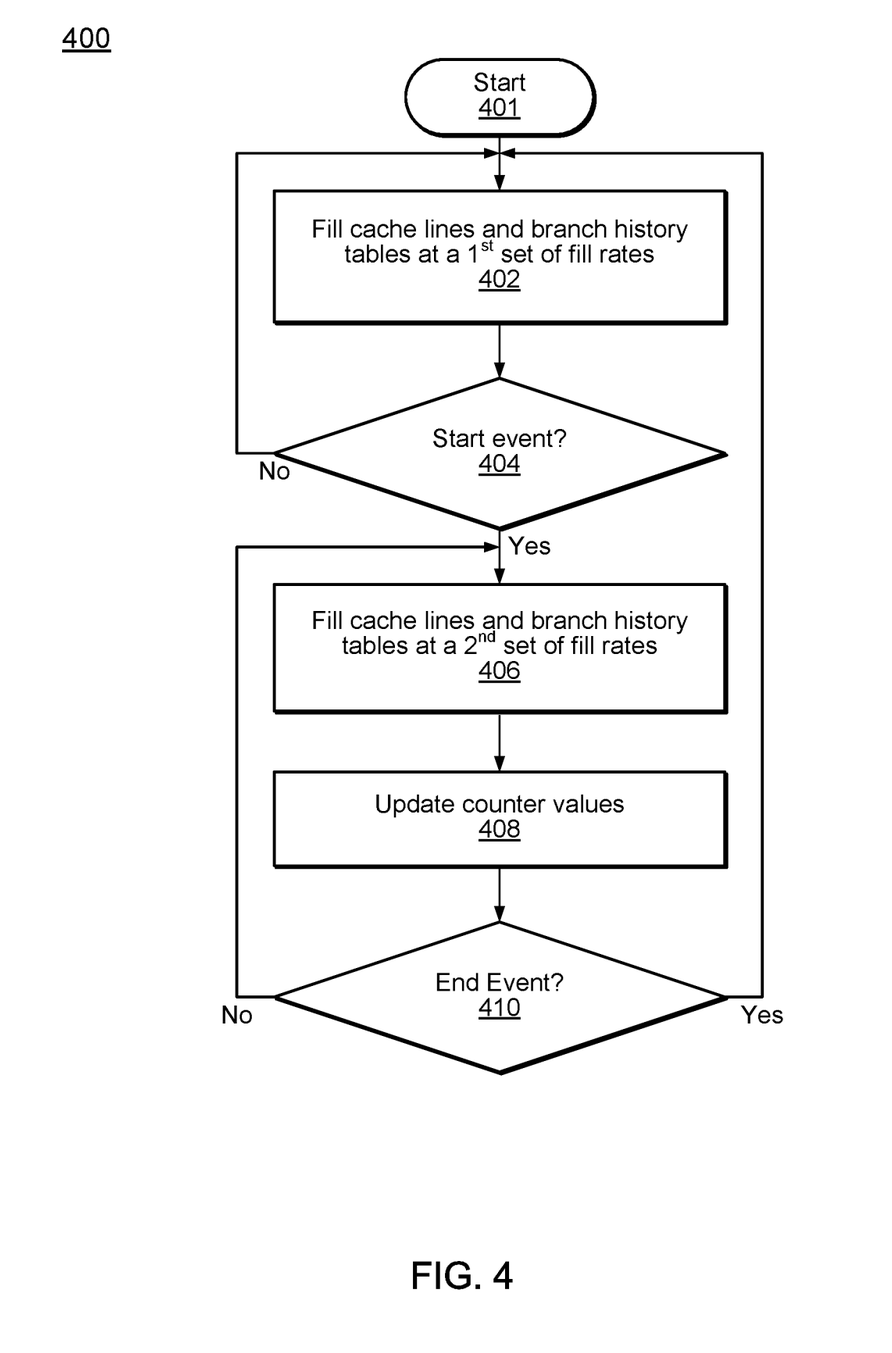
FIG. 4 illustrates a flow diagram of an embodiment of a method for operating a processing core after a cold reset.

Turning now to FIG. 4, a flow diagram illustrating an embodiment of a method for operating a processing core after a cold reset is shown. In some embodiments, method 400 may be applied to a processing core, such as, processing core 300 in FIG. 3, for example. Referring collectively to FIG. 3 and the flow diagram of FIG. 4, the method may begin in block 401.

In the illustrated embodiment, cache lines and branch history tables are filled at a first set of fill rates (block 402). During normal operation of processing core 300, data (e.g., instructions) is prefetched for instruction cache (I-cache) 302 and stored into Cache Line 312a-312n at a first rate. Upon execution of a given branch instruction, branch history of the given branch instruction is allocated into entries of branch history tables (BHTs) 316a-d at a second rate. Although any suitable rates may be used, in the present example, one Cache Lines 312a-n is filled for each cache prefetch and entries in two BHTs 316a-d are allocated for each branch instruction executed.

Further operations of the method may depend upon detection of a start event (block 404). Control circuitry, such as, for example, Scheduling Unit 304, determines if processing core 300 is operating in a normal operating mode or if a start event has occurred. Various conditions may result in a start event, such as, for example, a power-on reset (POR), a recovery from a reduced power mode, a power brown-out, or an exception generated by a system protection mechanism such as, e.g., a watchdog, an illegal address, an illegal opcode exception, or any exception that may indicate that the processor/SoC is not operating as expected. If a start event is detected, then the method moves to block 406 to adjust the fill rates for Cache Lines 312*a-n* and BHTs 316*a-d*. Otherwise, the method returns to block 402 and continues to use the first set of fill rates.

Upon a determination that a start event has occurred, Scheduling Unit 304, in the present embodiment, causes Cache Lines 312*a-n* and BHTs 316*a-d* to be refilled using a second set of fill rates (block 406). The start event may indicate that data stored in Cache Lines 312*a-n* and BHTs 316*a-d* is corrupt or otherwise been lost. Instruction Cache 302 and branch prediction unit (BPU) 306 may provide little benefit to the operation of processing core 300 when they are storing little to no valid data. To reduce the time for these resources to provide benefit to processing core 300, the refill rates may be increased temporarily. In the illustrated embodiment, two cache lines (instead of one) are filled during each Instruction Cache 302 prefetch operation and entries are allocated in three BHTs 316*a-d* (instead of two) for each branch instruction executed.

Counters to track operational parameters are updated (block 408). To determine when sufficient data has been refilled into Cache Lines 312*a-n* and BHTs 316*a-d*, Scheduling Unit 304 utilizes one or more counters, such as, e.g., Counter 305*a-b*, to track one or more operational parameters related to the operation of Instruction Cache 302 and BPU 306. In various embodiments, scheduling unit may include a single counter circuit to track a single operational parameter associated with both Instruction Cache 302 and BPU 306, or may include multiple parameters associated with Instruction Cache 302, BPU 306, or both. Tracked parameters may include any of cache lines filled, cache hits, cache misses, cache line evictions, branch history entries successfully allocated, failed branch history allocations, a number of useful bits set in branch history tables, and the like.

Further operations may depend upon detection of an end condition (block 410). In the current embodiment, an end condition refers to point in time after the reset in which Instruction Cache 302 and/or BPU 306 are determined to include enough data to return to the normal fill rates. Each Counter 305*a-b* includes at least one count value for tracking a corresponding operational parameter. In the present embodiment, each count value is compared to a respective threshold. An indication that the increased refill rates have resulted in sufficient data being stored includes a count value reaching a threshold value. In some embodiments, a single count value reaching a threshold may indicate that both Instruction Cache 302 and BPU 306 have been filled with enough data to return to the normal fill rate. In such an embodiment, if the single value reaches the threshold, the method returns to block 402 to return to the normal fill rates. Otherwise, the method returns to block 406 to continue using the increased fill rates.

In other embodiments, Instruction Cache 302 and BPU 306 may each have a corresponding count value. In such embodiments, if the I-cache count value reaches its respective threshold before the BPU count value reaches its respective threshold, then an end condition has occurred and Scheduling Unit 304 returns Instruction Cache 302 to its normal fill rate while BPU 306 remains at its increased refill rate, and vice versa. In some embodiments, two or more count values may be used together to determine a performance value that is compared to the threshold to determine an occurrence of an end condition.

It is noted that the method illustrated in FIG. 4 is merely an example for demonstration. In other embodiments, additional operations may be included. In addition, operations may be performed in a different sequence in various embodiments.

It is also noted that, in some embodiments, one or more status bits may be used to track the reset and one or more end conditions. For example, one status bit may be used such that the bit is set to a first value upon an occurrence of the reset. This status bit may remain set to the first value until a count value reaches a predetermined value, at which time the status bit is set to a second value. Refill rates for Instruction Cache 302 or BPU 306 may be selected dependent upon the value of the status bit. In other embodiments, one status bit may be included for each of Instruction Cache 302 and BPU 306, with each status bit set to the first value upon the reset occurring and each bit individually set to the second value dependent upon respective counter values, such as from Counters 305*a-b*.

Figure 5:
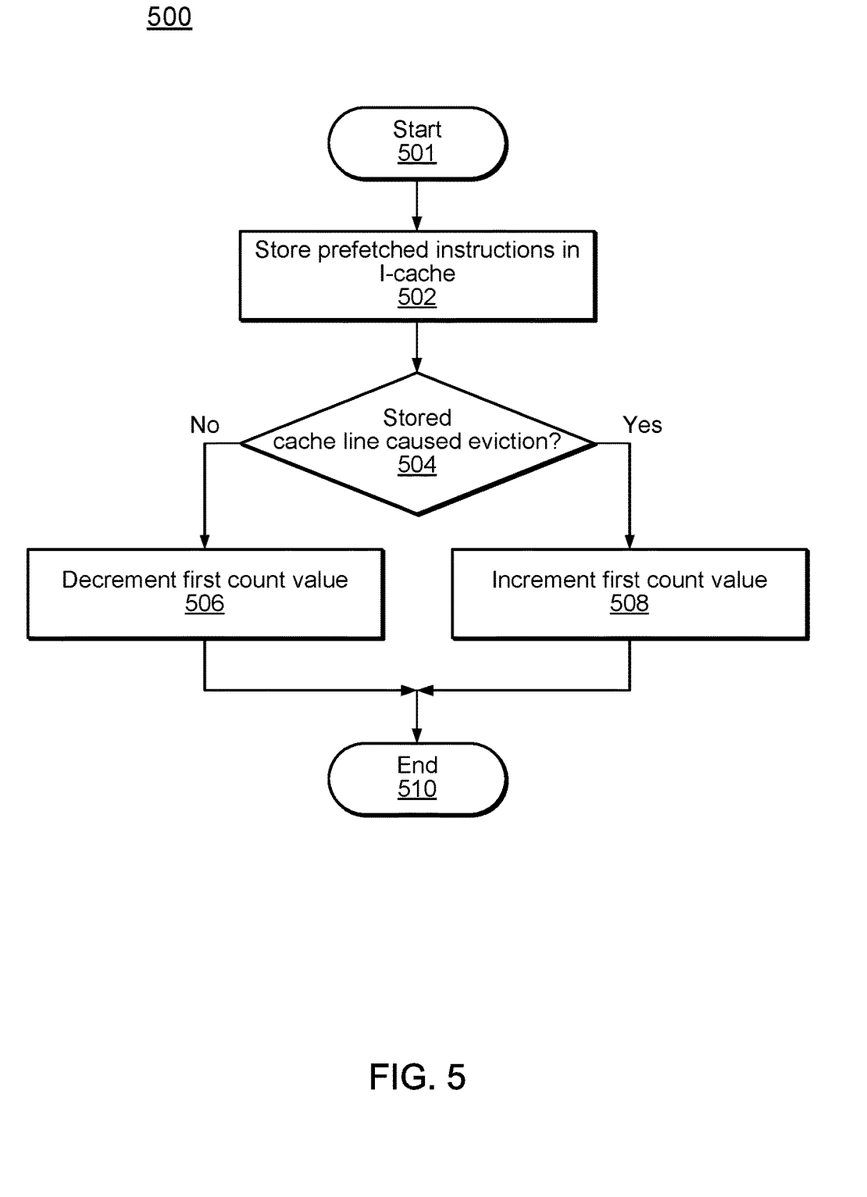
FIG. 5 illustrates a flow diagram depicting an embodiment of a method for tracking cache line fills.

Moving now to FIG. 5, a flow diagram illustrating an embodiment of a method for tracking cache line fills is shown. Method 500 may be performed as part of operations included in block 408 of method 400 in FIG. 4. In some embodiments, method 500 may be applied to a scheduling unit, such as, for example, Scheduling Unit 304 in FIG. 3. Referring collectively to FIG. 3 and the flow diagram of FIG. 5, the method may begin in block 501 with processing core 300 recovering from a reset.

In the illustrated embodiment, two cache lines are filled during each prefetch operation during for an increased refill rate after the reset (block 502). Instructions that are prefetched are stored in an instruction cache, such as, for example Instruction Cache 302. An associated cache line is selected for storing the prefetched instructions based on the memory address of the prefetched instructions. In various embodiments, each memory address may have one, two, four, or other suitable number of associated cache lines. The prefetched instructions are stored in an empty associated cache line, or, if an associated cache line is not available, then currently stored instructions may be evicted from one of the associated cache lines and the just prefetched instructions stored in the evicted cache line. Since each prefect operation after a reset fetches instructions to fill two cache lines, each prefetch operation may result in zero, one, or two evictions. Although two cache lines are refilled in the current embodiment, any suitable number of cache lines may be refilled in other embodiments.

Further operations of the method may depend on a determination if the most recent prefetch operation resulted in a cache line eviction (block 504). For each cache line filled in the most recent prefetch operation, control logic (e.g., Scheduling Unit 304) determines if an eviction was necessary to fill the cache line. If an eviction was not required, then a corresponding count value is decremented (block 506). Scheduling Unit 304 may, in some embodiments, decrement the count value in a counter, such as, for example, Counter 305*a*, upon determining that a cache line was filled without the need to evict previously stored instructions.

Alternatively, if an eviction was necessary, a corresponding count value may be incremented (bock 508). In various embodiments, Scheduling Unit 304 increments the count value in Counter 305*a*, in response to determining that previously stored instructions were evicted from a cache line before being filled. The method then concludes in block 510.

It is noted that the method illustrated in FIG. 5 is merely an example for demonstration. In other embodiments, additional operations may be included. In addition, operations may be performed in a different sequence in various embodiments.

Figure 6:
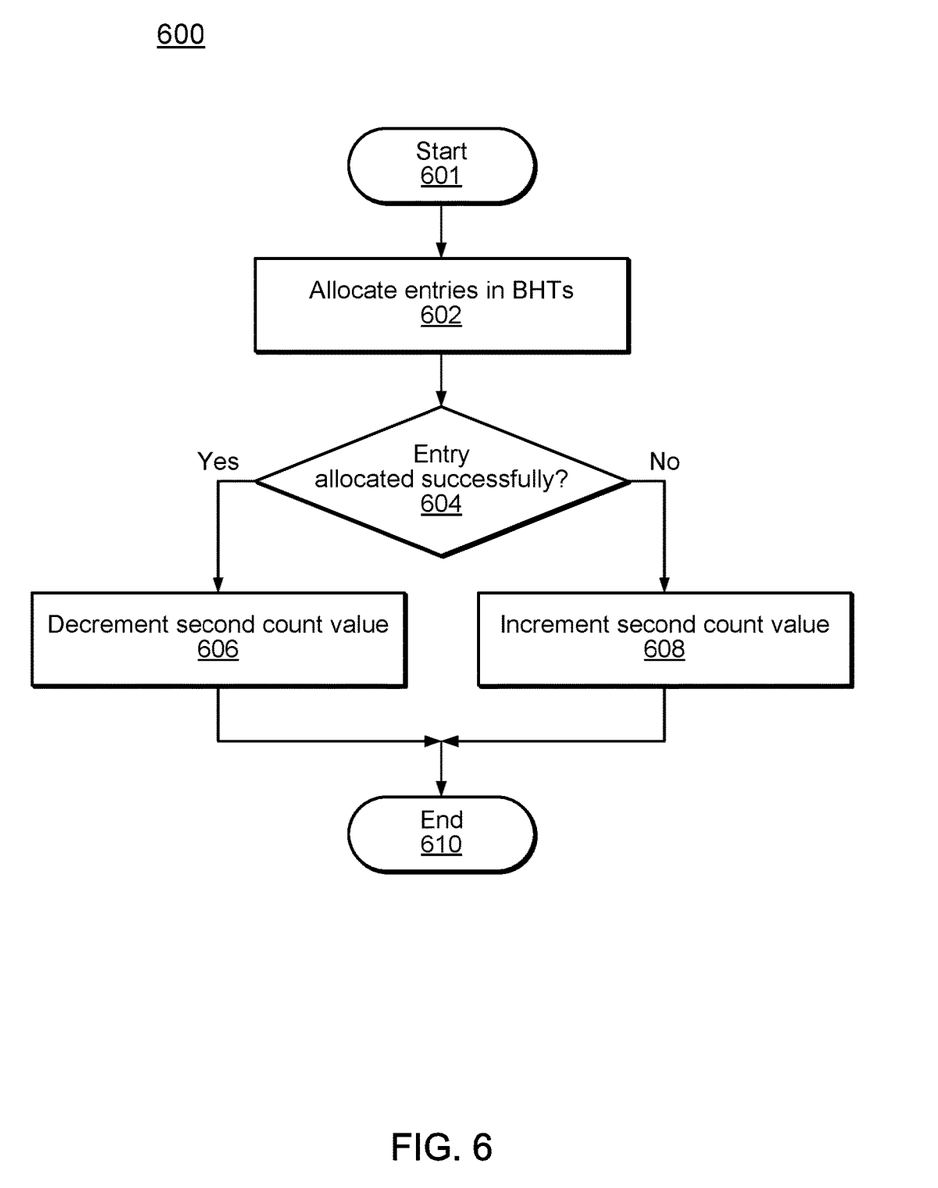
FIG. 6 illustrates a flow diagram depicting an embodiment of a method for tracking prediction table allocations.

Turning now to FIG. 6, a flow diagram of an embodiment of a method for tracking prediction table allocations is shown. Similar to method 500, method 600 may also be performed as part of operations included in block 408 of method 400 in FIG. 4. In some embodiments, method 600 may be applied to a scheduling unit, such as, for example, Scheduling Unit 304 in FIG. 3. Referring collectively to FIG. 3 and the flow diagram of FIG. 6, the method may begin in block 601 with processing core 300 recovering from a reset.

In the illustrated embodiment, three branch history tables (BHTs) are filled in response to an execution of a branch instruction as part of an increased refill rate after the reset (block 602). Upon execution of a branch instruction, one or more entries may be allocated within one or more BHTs, such as, for example, BHTs 316a-d. Upon execution of a branch instruction, control logic, such as, e.g., Scheduling Unit 304 may allocate an entry in one or more BHTs to record the direction taken during this execution of the instruction. During normal operation of processing core 300, entries may be allocated into one or two selected BHTs for each execution of a given branch instruction. After a reset, Scheduling Unit 304 may select an increased number of BHTs until a determination is made that the BHTs have enough allocated entries. In the current embodiment, three BHTs are selected for each branch instruction executed. In other embodiments, however, any suitable number of BHTs may be selected in response to the increased fill rate.

As used herein, "allocating" an entry refers to creating an entry in a respective BHT for a given branch instruction when an existing entry corresponding to the given branch instruction is not found. When a current entry for the given branch instruction is found in a selected BHT, an indication of the latest direction taken by the branch instruction is added to the current entry. When a current entry is not found in a selected BHT, Scheduling Unit 304 allocates a new entry corresponding to the given branch instruction. In some embodiments, locations of entries in a given BHT are determined dependent upon the address where the given branch instruction is located in memory, with a given address having 1, 2, 4, or any suitable number of corresponding entries in a given BHT. To successfully allocate a new entry for the given branch instruction, at least one of the corresponding entries must be available. If all corresponding entries are currently allocated to other branch instructions and those allocated entries are useful (e.g., the corresponding useful bit is set, as described above), then the allocation is unsuccessful.

Further operations of the method may depend on a determination if the most recent BHT entry allocation resulted in a successful allocation (block 604). For each allocation of a new entry into one of BHTs 316a-d, Scheduling Unit 304 determines if the allocation was successful or not. If an allocation was successful, then a corresponding count value may be decremented (block 606). Scheduling Unit 304 may, in some embodiments, decrement the count value in a counter, such as, for example, Counter 305b, upon determining that the allocation was successful. The method then ends in block 610.

In contrast, if the allocation was unsuccessful, a corresponding count value is incremented (block 508). In various embodiments, Scheduling Unit 304 increments the count value in Counter 305b in response to determining that the allocation was unsuccessful. The method then ends in block 610.

It is noted that the method illustrated in FIG. 6 is an example for demonstrating the disclosed concepts. In other embodiments, operations may be performed in a different sequence in various embodiments. Furthermore, additional operations may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory;
   a control circuit configured to:
      store a plurality of entries, wherein each entry is indicative of a history of at least one branch prediction; and
      store a first number of entries in the memory in response to a determination that a first branch instruction is executed after a reset and prior to a first end condition, wherein the first end condition is based on an amount of unused storage in the memory; and
      store a second number of entries in the memory in response to a determination that a second branch instruction is executed after the first end condition, wherein the second number is less than the first number.

2. The apparatus of claim 1, further comprising a cache memory, and wherein the control circuit is further configured to:
   pre-fetch and store a first quantity of instruction data in response to a determination that a first pre-fetch operation request is received after the reset and prior to a second end condition, wherein the second end condition is based on an amount of unused storage in the memory; and
   pre-fetch and store a second quantity of instruction data in response to a determination that a second pre-fetch operation request is received after the second end condition, wherein the second quantity is less than the first quantity.

3. The apparatus of claim 1, wherein the first end condition is based on a number of entries unsuccessfully allocated after the reset.

4. The apparatus of claim 3, wherein to allocate the first number of entries, the control circuit is further configured to:
   decrement a count value in response to a determination that a given entry of the first number of entries is successfully allocated; and
   increment the count value in response to a determination that the given entry of the first number of entries is not successfully allocated.

5. The apparatus of claim 2, wherein the second end condition is based on a number of cache evictions that occur after the reset.

6. The apparatus of claim 5, wherein to pre-fetch and store the first quantity of instruction data, the control circuit is further configured to:
   decrement a count value in response to a determination that a portion of the first quantity of instruction data was successfully stored in the memory; and
   increment the count value in response to a determination that storing the portion of the first quantity of instruction data resulted in an eviction in the memory.

7. The apparatus of claim 1, wherein the reset corresponds to a power-on reset.

8. A method, comprising:
   allocating, by control circuitry, a respective entry into each of a first number of branch history tables stored in a memory in response to determining that a first branch instruction is executed after a reset and prior to a first end condition, wherein the first end condition is based on an amount of unused storage in the memory; and
   allocating, by the control circuitry, a respective entry into each of a second number of branch history tables stored in the memory in response to determining that a second branch instruction is executed after the first end condition, wherein the second number is less than the first number.

9. The method of claim 8, further comprising:
   pre-fetching and storing, into a cache memory, a first quantity of instruction data in response to determining that a first pre-fetch operation request is received after the reset and prior to a second end condition, wherein the second end condition is based on an amount of unused storage in the cache memory; and
   pre-fetching and storing, into the cache memory, a second quantity of instruction data in response to determining that a second pre-fetch operation request is received after the second end condition, wherein the second quantity is less than the first quantity.

10. The method of claim 9, wherein prefetching and storing the first quantity of instruction data into the memory includes:
    decrementing a count value in response to determining that a given portion of the first quantity of instruction data was successfully stored in a respective location of the memory; and
    incrementing the count value in response to determining that storing the given portion of the first quantity of instruction data resulted in an eviction of previously stored instruction data.

11. The method of claim 9, wherein the second end condition is dependent upon a number of cache evictions that occur after the reset.

12. The method of claim 8, wherein the first end condition is based on a number of entries unsuccessfully allocated after the reset.

13. The method of claim 8, wherein allocating the respective entry into each of the first number of branch history tables includes:
    decrementing a count value in response to determining that allocating a given entry into one of the first number of branch history tables is successful; and
    incrementing the count value in response to determining that allocating the given entry into the one of the first number of branch history tables is unsuccessful.

14. The method of claim 8, wherein the reset corresponds to a recovery from a reduced power mode.

15. A system, comprising:
    a plurality of memories, wherein each memory of the plurality of memories includes a plurality of entries, and wherein each entry of the plurality of entries is configured to store a history of a branch prediction; and
    control logic configured to:
       allocate a first number of entries of the plurality of entries in respective memories of the plurality of memories in response to a determination that a first branch instruction is executed after a reset and prior to a first end condition, wherein the first end condition is dependent upon a number of unused entries allocated in the memory; and
       allocate a second number of entries of the plurality of entries in respective memories of the plurality of memories in response to a determination that a second branch instruction is executed after the first end condition, wherein the second number is less than the first number.

16. The system of claim 15, wherein the first end condition is dependent upon a number of entries unsuccessfully allocated after the reset, and wherein to allocate the first number of entries, the control logic is further configured to:
    decrement a first count value in response to a determination that a given entry of the first number of entries was allocated successfully; and
    increment the first count value in response to a determination that the given entry of the first number of entries was not allocated successfully.

17. The system of claim 15, further comprising a cache memory, wherein the control logic is further configured to:
    pre-fetch and store a first quantity of instruction data in response to a determination that a first pre-fetch operation request is received after the reset and prior to a second end condition, wherein the second end condition is dependent upon an amount of unused storage in the cache memory; and
    pre-fetch and store a second quantity of instruction data in response to a determination that a second pre-fetch operation request is received after the second end condition, wherein the second quantity is less than the first quantity.

18. The system of claim 17, wherein the second end condition is dependent upon a number of cache evictions that occur after the reset.

19. The system of claim 18, wherein to pre-fetch and store the first quantity of instruction data, the control logic is further configured to:
    decrement a second count value in response to a determination that a given portion of the first quantity of instruction data was successfully stored in the cache memory; and
    increment the second count value in response to a determination that storing the given portion of the first quantity of instruction data resulted in a cache eviction.

20. The system of claim 15, wherein the reset corresponds to an exception generated by a system protection mechanism.

* * * * *

UNITED STATES PATENT AND TRADEMARK OFFICE
CERTIFICATE OF CORRECTION

PATENT NO. : 10,007,616 B1  
APPLICATION NO. : 15/062448  
DATED : June 26, 2018  
INVENTOR(S) : Brett S. Feero et al.

Page 1 of 1

It is certified that error appears in the above-identified patent and that said Letters Patent is hereby corrected as shown below:

In the Claims

Claim 2, Column 14, Line 57-59, please delete "condition is based on an amount of unused storage in the memory" and insert --condition is based on an amount of unused storage in the cache memory--.

Claim 6, Column 15, Line 19-20, please delete "instruction data resulted in an eviction in the memory" and insert --instruction data resulted in an eviction in the cache memory--.

Signed and Sealed this  
Fourteenth Day of April, 2020

Andrei Iancu  
*Director of the United States Patent and Trademark Office*